United States Patent
Nishihara et al.

(10) Patent No.: US 7,789,021 B2
(45) Date of Patent: Sep. 7, 2010

(54) SUSPENSION CONVEYANCE APPARATUS

(75) Inventors: Shigeyoshi Nishihara, Shiga (JP); Tomohiro Sugo, Shiga (JP)

(73) Assignee: Daifuku Co., Ltd. (JP)

( * ) Notice: Subject to any disclaimer, the term of this patent is extended or adjusted under 35 U.S.C. 154(b) by 51 days.

(21) Appl. No.: 12/360,296

(22) Filed: Jan. 27, 2009

(65) Prior Publication Data

US 2009/0205532 A1    Aug. 20, 2009

(30) Foreign Application Priority Data

Feb. 14, 2008   (JP)   ............................... 2008-32726

(51) Int. Cl.
B61C 13/00    (2006.01)

(52) U.S. Cl. ........................ 105/153; 105/148; 105/149; 105/150; 105/154; 105/155; 104/89; 104/93; 104/94; 104/95; 104/172.4

(58) Field of Classification Search ............ 104/89, 104/93, 94, 95, 172.4; 105/30, 32, 33, 148, 105/150, 153, 154, 155
See application file for complete search history.

(56) References Cited

U.S. PATENT DOCUMENTS

| | | | | |
|---|---|---|---|---|
| 2,945,453 A | * | 7/1960 | Adams | 104/172.4 |
| 3,011,457 A | * | 12/1961 | Peras | 104/172.4 |
| 3,074,356 A | * | 1/1963 | Parker et al. | 104/172.4 |
| 3,249,064 A | * | 5/1966 | Barry | 104/93 |
| 3,628,462 A | * | 12/1971 | Holt | 104/105 |
| 3,724,391 A | * | 4/1973 | Velde | 104/172.4 |
| 3,827,367 A | * | 8/1974 | Paglia | 104/93 |
| 3,999,730 A | * | 12/1976 | Gonsalves et al. | 246/434 |
| 4,148,261 A | * | 4/1979 | Wakabayashi | 104/172.4 |
| 4,532,385 A | * | 7/1985 | Friske | 191/23 A |
| 4,646,650 A | * | 3/1987 | Kondo et al. | 104/172.3 |
| 4,669,388 A | * | 6/1987 | Dehne et al. | 104/162 |
| 4,745,865 A | * | 5/1988 | Dehne | 104/172.3 |
| 4,924,996 A | * | 5/1990 | Svensson et al. | 198/341.05 |
| 4,987,638 A | * | 1/1991 | Ribaudo | 16/89 |
| 5,235,917 A | * | 8/1993 | Luck et al. | 104/119 |
| 5,340,249 A | * | 8/1994 | Nakamura | 410/78 |
| 5,450,796 A | * | 9/1995 | Sakagami | 104/89 |
| 5,505,290 A | * | 4/1996 | Fujii et al. | 198/345.1 |

(Continued)

FOREIGN PATENT DOCUMENTS

JP    2003-267208    9/2003

*Primary Examiner*—S. Joseph Morano
*Assistant Examiner*—Jason C Smith
(74) *Attorney, Agent, or Firm*—St. Onge Steward Johnston & Reens LLC

(57) ABSTRACT

A suspension conveyance apparatus has a conveying traveling body movably supported on a traveling guide rail and a hanger suspended from the conveying traveling body, and an anti-swaying guide rail in parallel with the traveling guide rail, the anti-swaying guide rail is engaged with a roller and prevents lateral swaying of the hanger. The anti-swaying guide rail is installed on only one of the right and left sides of the traveling guide rail and includes a horizontal flat rail surface and a circular rail surface curvedly protruding in the vertically opposite direction of the horizontal flat rail surface, and a flat peripheral surface roller adjoining to the horizontal flat rail surface and rolling and an hourglass-shaped peripheral surface roller fitted to the circular rail surface are provided as the roller.

4 Claims, 6 Drawing Sheets

U.S. PATENT DOCUMENTS

| | | | |
|---|---|---|---|
| 5,632,207 A * | 5/1997 | Roberts et al. | 104/288 |
| 6,192,803 B1 * | 2/2001 | Nishino | 104/93 |
| 6,196,372 B1 * | 3/2001 | Rossi | 198/345.1 |
| 6,360,671 B1 * | 3/2002 | Nakagami | 104/168 |
| 6,695,126 B2 * | 2/2004 | Minamikawa | 198/680 |
| 6,766,894 B2 * | 7/2004 | Arai et al. | 198/465.4 |
| 7,089,868 B2 * | 8/2006 | Kawato et al. | 104/103 |
| 7,201,105 B2 * | 4/2007 | Nishihara et al. | 104/172.3 |
| 7,225,914 B2 * | 6/2007 | Nakamura et al. | 198/465.4 |
| 7,296,521 B2 * | 11/2007 | Kawato et al. | 104/103 |
| 7,461,735 B2 * | 12/2008 | Nakamura | 198/465.4 |
| 7,484,616 B2 * | 2/2009 | Nakamura | 198/465.4 |
| 7,650,843 B2 * | 1/2010 | Minges | 104/178 |
| 2003/0000413 A1 * | 1/2003 | Arai et al. | 104/89 |
| 2004/0011239 A1 * | 1/2004 | Kawato et al. | 104/172.4 |
| 2004/0261648 A1 * | 12/2004 | Nishihara et al. | 104/163 |
| 2005/0183620 A1 * | 8/2005 | Kawato et al. | 104/89 |
| 2006/0266253 A1 * | 11/2006 | Kawato et al. | 104/172.1 |
| 2007/0289845 A1 * | 12/2007 | Takano et al. | 198/465.4 |
| 2008/0148992 A1 * | 6/2008 | Bambrick et al. | 105/30 |
| 2009/0193998 A1 * | 8/2009 | Nishihara et al. | 104/91 |
| 2009/0205532 A1 * | 8/2009 | Nishihara et al. | 105/149 |

* cited by examiner

US 7,789,021 B2

SUSPENSION CONVEYANCE APPARATUS

TECHNICAL FIELD

The present invention relates to a suspension conveyance apparatus composed of a conveying traveling body movably supported on a traveling guide rail and an object support tool suspended from the conveying traveling body.

RELATED ART

Suspension conveyance apparatuses of this kind are composed of a conveying traveling body and an object support tool (hanger) suspended from the conveying traveling body and also provided with an anti-swaying means preventing the object support tool from swaying sideways, for example, on a workline where component mounting work etc., is carried out with respect to an object that is supported by the object support tool, in the course of a transportation route of the conveying traveling body, as described in Japanese Published Unexamined Patent Application No. 2003-267208. A conventional anti-swaying means in suspension conveyance apparatuses of this kind as described in the above Publication is such that anti-swaying guide rails are arranged on both right and left sides of a traveling guide rail which supportingly guides the conveying traveling body, and horizontal axis rollers engaged with the anti-swaying guide rails respectively are pivotally supported on both right and left sides of the object support tool.

PROBLEMS TO BE SOLVED BY THE INVENTION

In the conventionally configured anti-swaying means as above, however, the anti-swaying guide rails must be arranged on both right and left sides of the traveling route with accuracy, which accordingly constitutes a problem of increasing installation costs. As a matter of course, if configured such that an anti-swaying U-shaped guide rail utilizing a groove-shaped steel is arranged as the anti-swaying guide rail and a roller fitted to the anti-swaying U-shaped guide rail thereupon to be vertically positioned is pivotally supported to the object support tool, as described in the aforementioned Publication, the anti-swaying U-shaped guide rail can also be arranged on only one of the right and left sides of the traveling guide rail. However, in any case, in the anti-swaying configuration of using the anti-swaying U-shaped guide rail and the roller fitted to the former, a certain amount of vertical allowance between the roller and the U-shaped guide rail is required in order for the roller to rotate smoothly. Thus, holding the object support tool in a fixed posture accurately is difficult. Further, in the suspension conveyance apparatus of this kind, a conveying traveling body configured by joining a plurality of trolleys with load bars is used, so that the conveying traveling body itself could also sway in the lateral direction relative to the guide rail. Accordingly, a position of a horizontal support shaft on the conveying traveling body side suspending the object support tool comes to sway in the lateral direction. As a result, the anti-swaying U-shaped guide rail and the roller fitted to the former cannot prevent without fail the object support tool from laterally moving when a lateral external force is exerted on the object support tool.

DETAILED DESCRIPTION OF THE INVENTION

It is an object of the present invention to provide a suspension conveyance apparatus capable of solving the aforementioned conventional problems. Described with reference numerals and letters of an embodiment described later in parentheses for reference, a suspension conveyance apparatus as described in a first aspect is composed of a conveying traveling body (1) movably supported on a traveling guide rail (2) and an object support tool (hanger (6)) suspended from the conveying traveling body and is also installed with an anti-swaying guide rail in parallel with the traveling guide rail (2), the anti-swaying guide rail engaged with a roller provided to the object support tool (hanger (6)) and preventing lateral swaying of the object support tool (hanger (6)), wherein the anti-swaying guide rail (31) is installed on only one of the right and left sides of the traveling guide rail (2) and is configured to include a horizontal flat rail surface (31a) and a circular rail surface (31b) curvedly protruding in the vertically opposite direction of the horizontal flat rail surface (31a), and a flat peripheral surface roller (53) adjoining to the horizontal flat rail surface (31a) and rolling and an hourglass-shaped peripheral surface roller (54) fitted to the circular rail surface (31b) are provided as the roller.

According to the above configured suspension conveyance apparatus in accordance with the present invention, the anti-swaying guide rail has to be installed on only one of the right and left sides of the traveling guide rail, so that installation costs of the anti-swaying guide rail can significantly be reduced. Moreover, the horizontal flat rail surface and circular rail surface provided on the anti-swaying guide rail are configured to be sandwiched from above and beneath by the flat peripheral surface roller adjoining to the horizontal flat rail surface and rolling and the hour glass-shaped peripheral surface roller fitted to the circular rail surface, and accordingly the vertical allowance between both upper and lower rollers and the anti-swaying guide rail can be substantially eliminated, and the lateral swaying of the object support tool can be prevented without fail. Furthermore, compared with a configuration that a rail surface having horizontally flat both upper and lower surfaces is simply sandwiched by a pair of upper and lower flat peripheral surface rollers, horizontal positioning of the object support tool can be done without fail due to the fitting of the circular rail surface and hourglass-shaped peripheral surface roller, and even if a relatively large horizontal external force is exerted on the object support tool, the positioning of the object support tool can be maintained without fail. As a result, workability relative to an object supported by the object support tool can remarkably be improved.

When the above configured present invention is carried out, more specifically, as described in a second aspect, the horizontal flat rail surface (31a) of the anti-swaying guide rail (31) can be formed from one side surface of a horizontal band-like plate portion (34) and the circular rail surface (31b) can be formed from a cylindrical member (33) attached to another side surface of the horizontal band-like plate portion (34). In this case, as described in a third aspect, the anti-swaying guide rail (31) is composed of an H-shaped steel (32) installed in such a direction that recess groove portions are formed on both right and left sides and a cylindrical member (33) attached downside of the H-shaped steel (32), the horizontal flat rail surface (31a) can be formed from an upper surface of a lower side horizontal band-like plate portion (34) of the H-shaped steel (32) and the circular rail surface (31b) can be formed from a peripheral surface of the downside of the cylindrical member (33). Further, as described in a fourth aspect, a roller introductory guide (40) can be arranged at least at an entrance-side end of the anti-swaying guide rail (31). The roller introductory guide (40) can be composed of an upper side flat guide surface (42) extending obliquely upward from an end of an upper side horizontal band-like plate portion (41) of the H-shaped steel (32), a lower side flat guide surface (43) extending obliquely downwardly from the lower side horizontal band-like plate portion (34) of the H-shaped steel (32), an upper side circular guide surface (44) extending obliquely upward from an end of the cylindrical member (33) and a lower side circular guide surface (45) extending obliquely downwardly from a downside position of the end of the cylindrical member (33).

On the other hand, according to the configuration as described in the second aspect, implementation is easier than a case where an anti-swaying guide rail provided with a horizontal flat rail surface and a circular rail surface on both upper and lower sides thereof is configured by forming a pipe member or cutting a round bar member. Furthermore, a guide rail with high accuracy can be configured easily. Further, according to the configuration as described in the third aspect, an anti-swaying guide rail with sufficient strength can easily be configured. Further, its horizontal flat rail surface can be protected by the horizontal band-like plate portion located at an upper side thereof while its circular rail surface is located as directed downwardly, and accordingly those horizontal flat rail and circular rail surfaces can be protected from dust, and intended swaying prevention effects can consistently be exhibited. Furthermore, according to the configuration as described in the fourth aspect, even a slightly swaying object support tool can be introduced smoothly and reliably into an area where the anti-swaying guide rail is installed, thereupon being able to obtain the intended swaying prevention effects.

DESCRIPTION OF SYMBOLS

Figure 1:
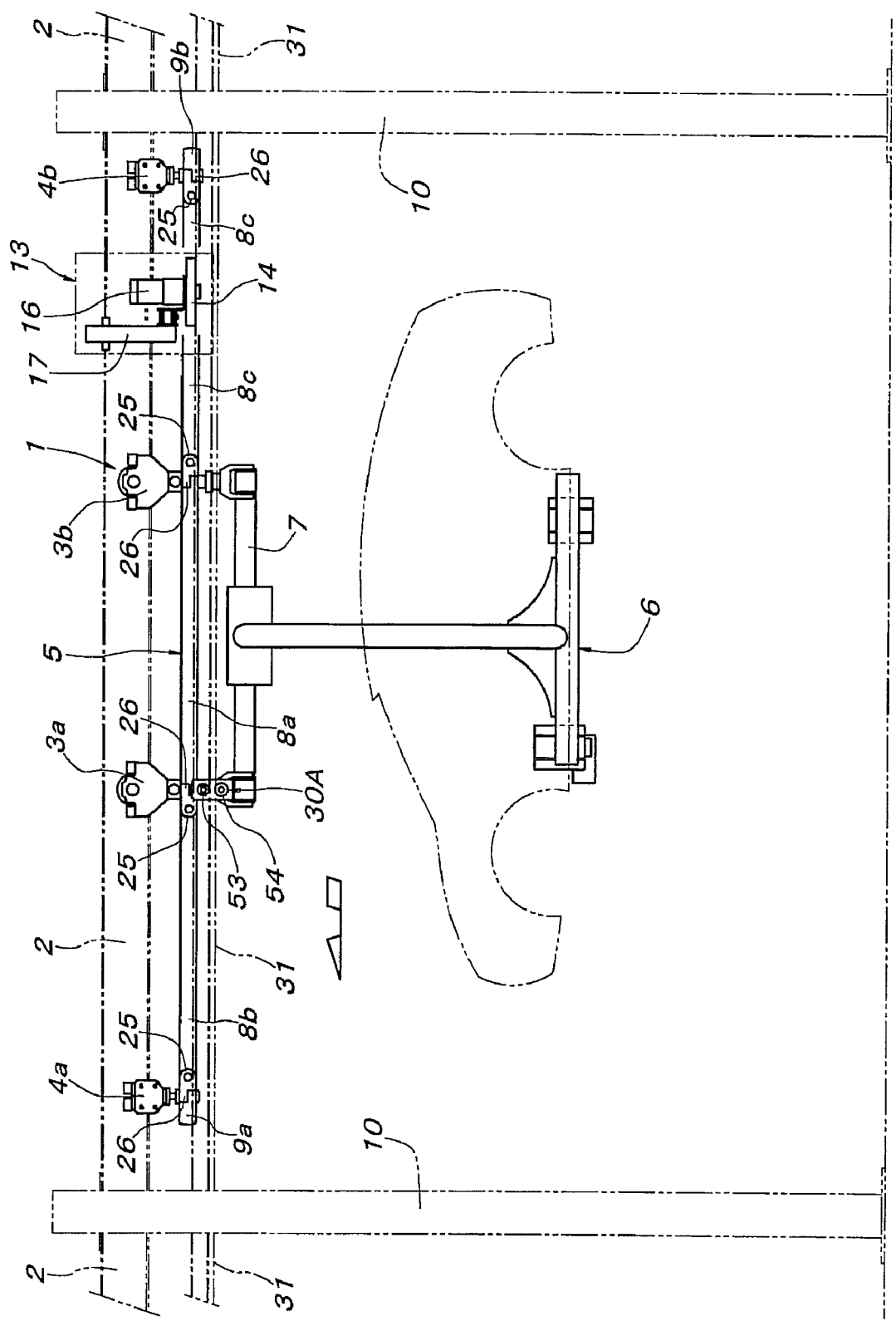
FIG. 1 is a side view showing a conveying traveling body and friction drive means in a traveling route.

1: conveying traveling body
2: guide rail
3a, 3b: load trolley
4a, 4b: free trolley
5: load bar
6: hanger (object support tool)
8a-8c: intermediate load bar unit
9a, 9b: front and rear end load bar unit
10: portal frame
13: friction drive means
14: friction drive wheel
15: backup roller
16: motor
30A, 30B: anti-swaying roller unit
31: anti-swaying roller unit
31a: horizontal flat rail surface
31b: circular rail surface
32: H-shaped steel
33: cylindrical member
34: lower side horizontal band-like plate portion of H-shaped steel
40: roller introductory guide
42: upper side flat guide surface
43: lower side flat guide surface
44: upper side circular guide surface
45: lower side circular guide surface
53: upper side flat peripheral surface roller
54: lower side hourglass-shaped peripheral surface roller

PREFERRED EMBODIMENT OF THE INVENTION

Figure 2:
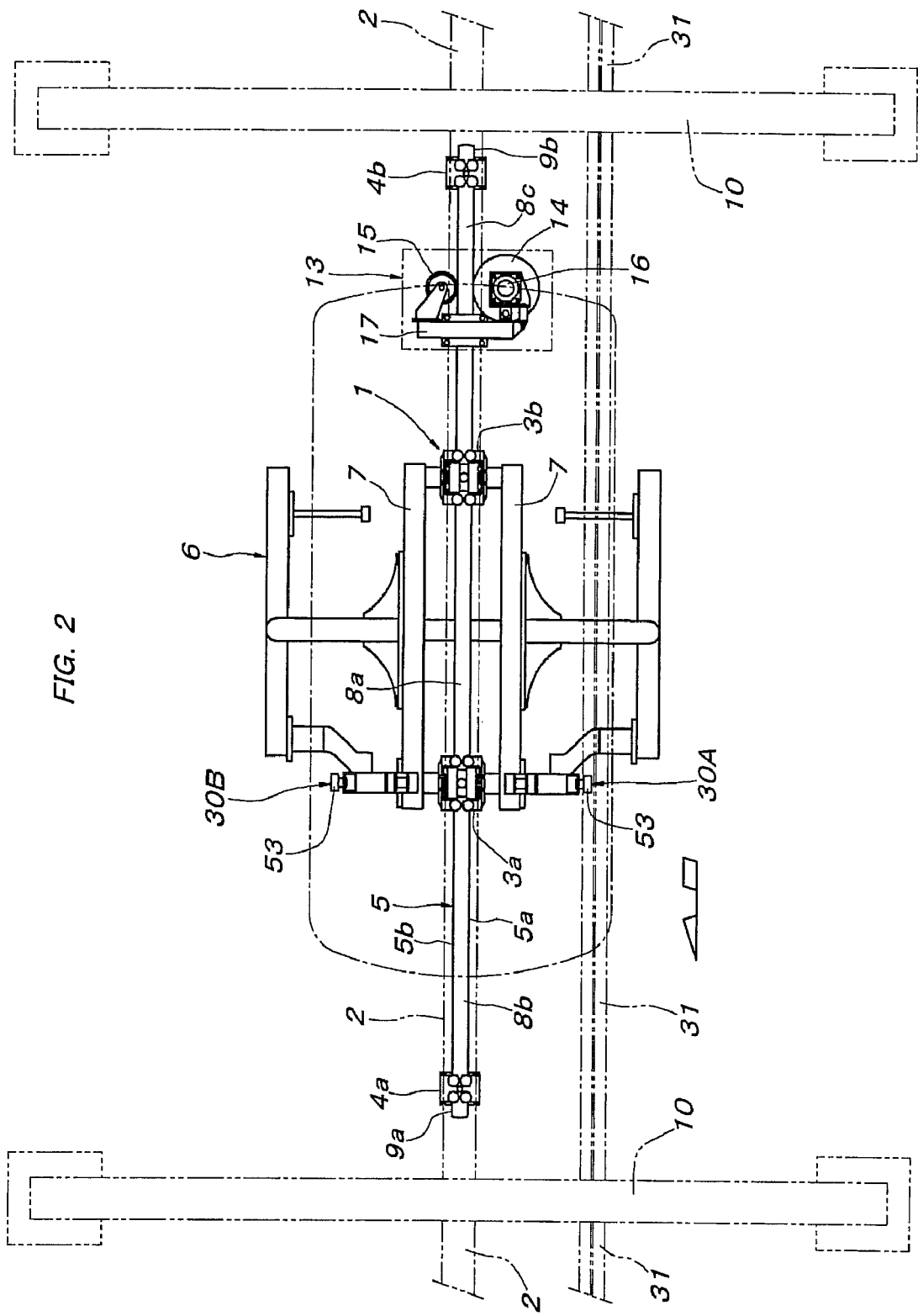
FIG. 2 is a plan view showing the same.
Figure 3:
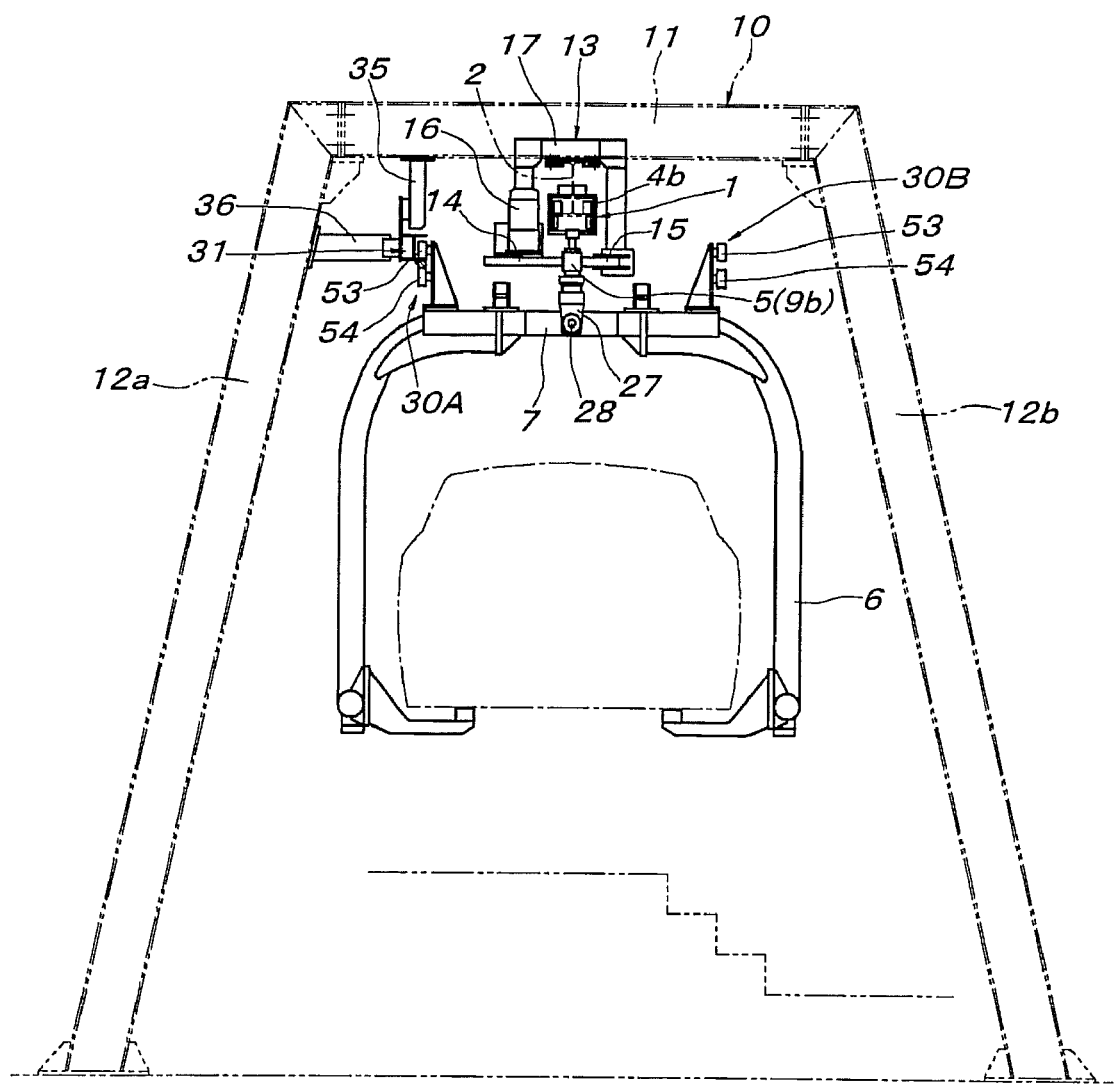
FIG. 3 is a rear view showing the same.

Hereinafter, a specific embodiment of the present invention is described based on the accompanying drawings. In FIGS. 1 to 3, reference numeral 1 is a conveying traveling body composed of four trolleys, that is, a pair of front and rear load trolleys 3a, 3b on the middle and a front and a rear end free trolley 4a, 4b, travelably engaged with a traveling guide rail 2 built at a predetermined height above a floor, a load bar 5 suspended by the four trolleys 3a to 4b and a hanger 6 as an object support tool. The load bar 5 is composed of three intermediate load bar units 8a to 8c joining the four trolleys 3a to 4b respectively and short front and rear end load bar units 9a, 9b coupled to the front and rear end free trolleys 4a, 4b and slightly protruding forward and rearward from the front and rear end free trolleys 4a, 4b.

On a traveling route of the hanger constituted by the traveling guide rail 2, portal frames 10 are mounted on the floor at appropriate intervals in a longitudinal direction of the traveling route. The traveling guide rail 2 is fixed and suspended on the center at a lower side of an upper end rail suspension frame portion 11 of the portal frame 10. As the portal frame 10, exemplified is one wherein a pair of right and left strut frame portions 12a, 12b supporting both ends of the horizontal rail suspension frame portion 11 has a flared trapezoidal shape. However, the portal frame 10 may be of a perpendicular inverted U-shape with the pair of right and left strut frame portions 12a, 12b being parallel or may be of a curved arch shape in its entirety. Further, portal frames 10 can be joined with each other by a joining frame other than the traveling guide rail 2, and the joining frame can be provided with a mount for maintenance work which a worker can get on, if necessary.

Friction drive means 13 are provided to the traveling guide rail 2 at appropriate intervals. The friction drive means 13 are conventionally well known and constituted by a friction drive wheel 14 pressure-contacting with one side surface 5a of right and left vertical side surface 5a, 5b of the load bar 5 (see FIG. 2), a backup roller 15 abutting against the other side surface 5b and a motor 16 rotation-driving the friction drive wheel 14. The backup roller 15 is only rotatably pivotally supported by a vertical support shaft at a fixed position of a frame 17 fixed with the traveling guide rail 2. The motor in which the friction drive wheel 14 is attached to a vertical output shaft is supported on the frame 17 horizontally movable relative to the side surface 5a of the load bar 5 and also urged by a spring to the pressure-contacting direction with the side surface 5a of the load bar 5.

Figure 4:
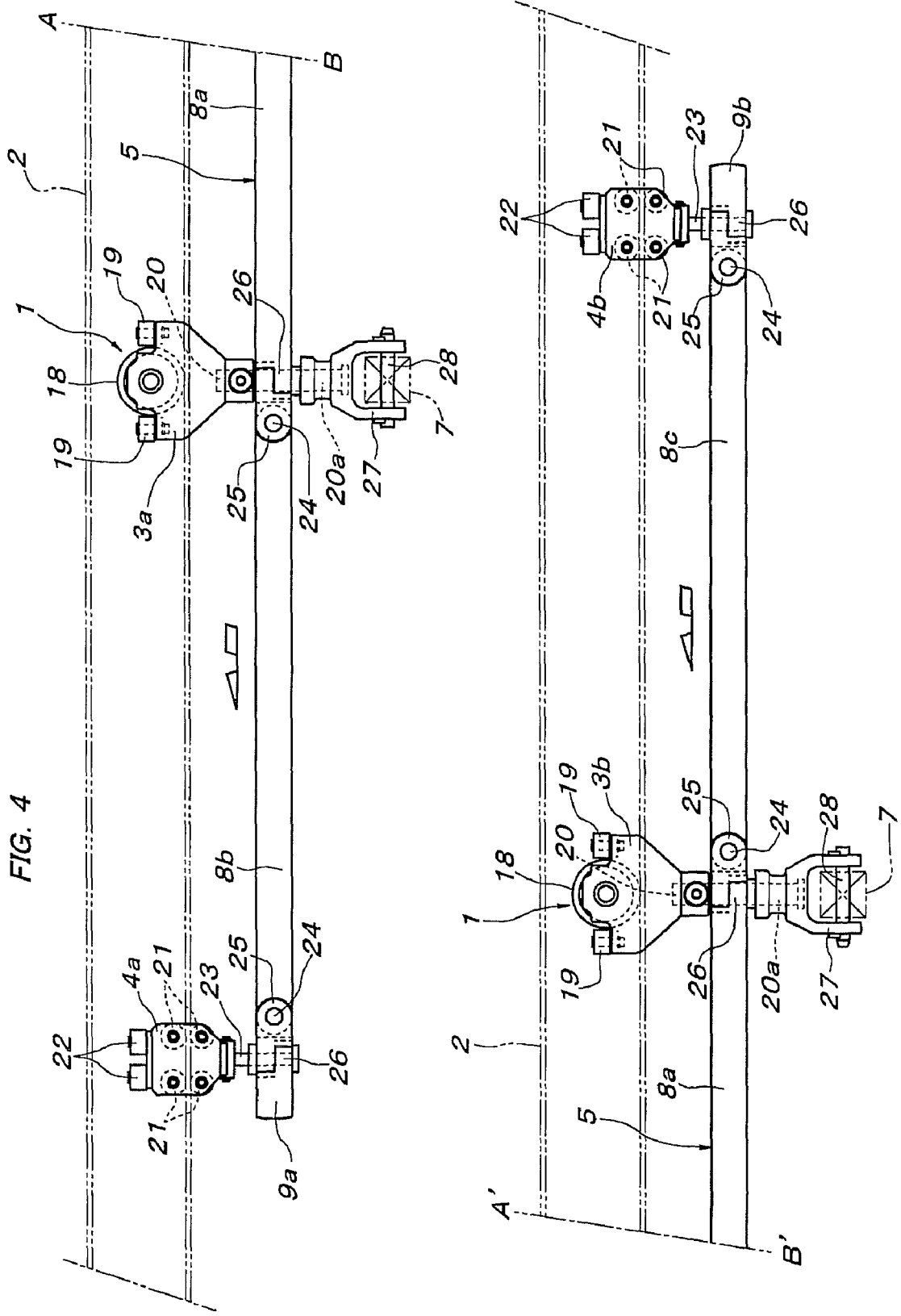
FIG. 4 is a side view showing the conveying traveling body linked by the line A-B and the line A'-B'.

The pair of front and rear load trolleys 3a, 3b include a pair of right and left main wheels 18 rolling on lower side horizontal rail portions of the traveling guide rail 2 with a cross-section shape of H-shaped steel lying sideways and two front and rear pairs of right and left vertical axis rollers 19 sandwiching a central vertical plate portion of the traveling guide rail 2 at the front and rear sides of the main wheel 18, as shown in FIG. 4. A vertical axis 20 protruding vertically downwardly is protrudingly provided and fixed at a central position directly below the traveling guide rail 2. The front and rear end free trolleys 4a, 4b are provided with a pair of upper and lower horizontal axis rollers 21 sandwiching the lower side horizontal rail portions of the traveling guide rail 2 from above and beneath at four places of front, rear, right and left, and further include two front and rear pairs of right and left vertical axis rollers 22 sandwiching the central upright plate portion of the traveling guide rail 2. In the same manner as the load trolleys 3a, 3b, a vertical axis 23 protruding vertically downwardly is protrudingly provided and fixed at a central position directly below the traveling guide rail 2.

Out of three intermediate load bar units 8a to 8c of the load bar 5, intermediate load bar units 8b, 8c joining the load trolleys 3a, 3b and the front and rear end free trolleys 4a, 4b are provided with vertically bent joint portions 25 vertically bendable about a horizontal support shaft 24, in positions near both ends thereof. Adjacent ends of respective intermediate load bar units 8a to 8c and the front and rear end load bar units 9a, 9b in the longitudinal direction of the load bar are joined with each other via horizontally bent joint portions 26 horizontally bendable about the vertical axes 20, 23 protruding vertically downwardly from respective trolleys 3a to 4b. Only the short front and rear end load bar units 9a, 9b are key-stopped by the vertical axes 23 protruding vertically downwardly from the front and rear end free trolleys 4a, 4b, and then integrated with the front and rear end free trolleys 4a, 4b.

The vertical axis 20 protruding vertically downwardly from the pair of front and rear load trolleys 3a, 3b extends downwardly from the load bar 5 and has a lower end extending portion 20a on which a hanger suspending bracket 27 is supported rotatably about the vertical axis 20. On a pair of front and rear hanger suspending brackets 27, an upper frame 7 of the hanger 6 is horizontally and vertically swingably suspended via a horizontal support shaft 28 parallel to the traveling direction of the hanger.

According to the conveying traveling body 1 as configured above, smooth traveling even in an up and down slope route section or horizontally curved route section in the traveling route constituted by the traveling guide rail 2 can be achieved due to the presence of each vertically bent joint portion 25 and each horizontally bent joint portion 26 provided to the load bar 5 in the position directly below or near each trolley 3a to 4b suspending the load bar 5. Thus, when each conveying traveling body 1 passes through the position of the friction drive means 13, the friction drive wheel 14 of the friction drive means 13 pressure-contacts with the side surface 5a of the load bar 5. Therefore, if the friction drive wheel 14 is rotation-driven by the motor 16 in a predetermined direction at a predetermined speed at that moment, the conveying traveling body 1 is propelled by the friction drive wheel 14 in the predetermined direction at the predetermined speed.

To the upper frame 7 of the hanger 6 of the conveying traveling body 1 as configured and driven above, as shown in FIGS. 1 to 3, there are provided anti-swaying roller units 30A, 30B on both right and left sides at the front end of the upper frame 7. Both anti-swaying roller units 30A, 30B have the same structure as arranged bilaterally symmetric when the conveying traveling body 1 is viewed from the front. Thus, the hanger 6 is suspended by the pair of front and rear load trolleys 3a, 3b relative to the traveling guide rail 2, and the load trolleys 3a, 3b have an appropriate lateral allowance as well with respect to the traveling guide rail 2. As a result, the hanger 6 is capable of swaying laterally relative to the traveling guide rail 2. Thus, in a specific section where prevention of a lateral swaying movement of the hanger 6 is especially demanded in the course of the hanger traveling route such as a work zone of carrying out an operation relative to the object having been loaded on the hanger 6, an anti-swaying guide rail 31 is installed on only one of the right and left sides of the traveling guide rail 2 so as to be engaged with either one of the pair of right and left anti-swaying roller units 30A, 30B provided on the upper frame 7 of the hanger 6, for example, with the anti-swaying roller unit 30A as shown in FIG. 2 and FIG. 3.

Figure 5:
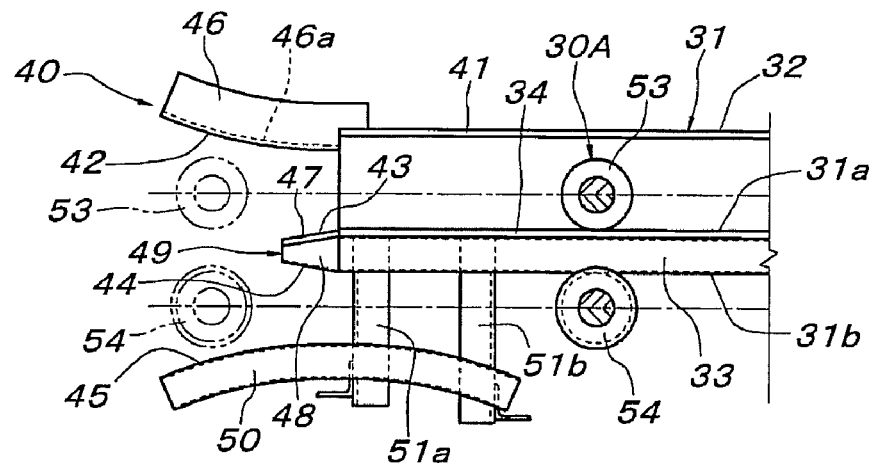
FIG. 5 is a longitudinal sectional side view showing a main part when an anti-swaying guide rail and a roller unit engaged with the former are viewed from the conveying traveling body side.
Figure 6:
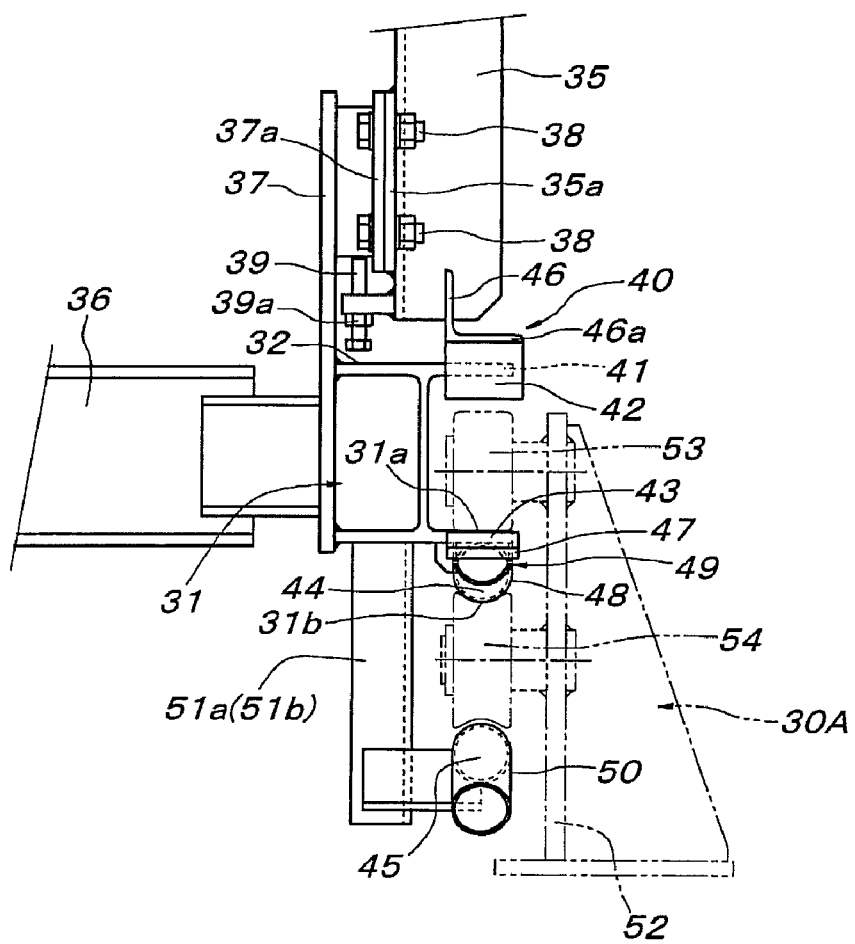
FIG. 6 is a rear view of the anti-swaying guide rail.
Figure 7:
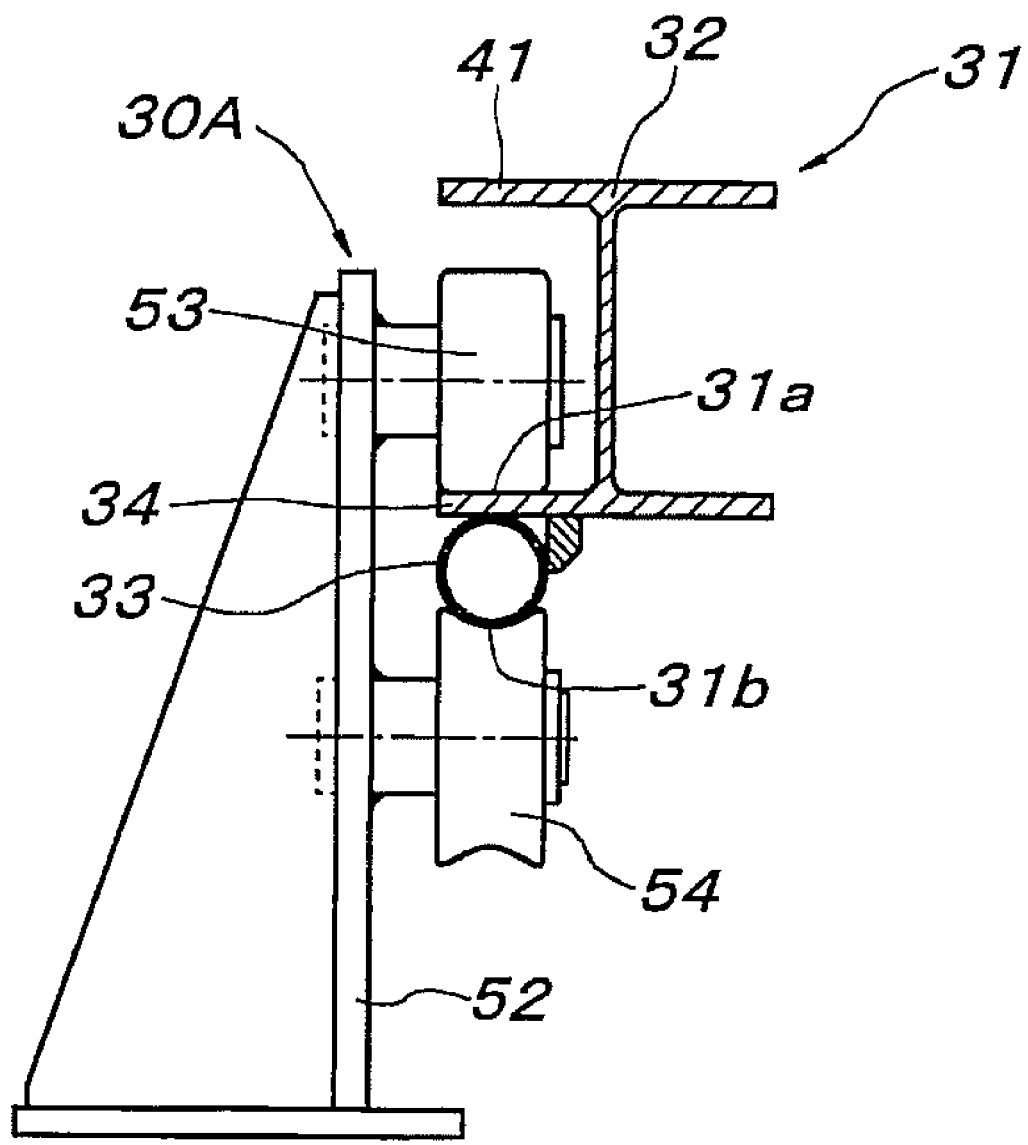
FIG. 7 is a longitudinal sectional front view showing the anti-swaying guide rail and the roller unit engaged with the former.

As shown in FIGS. 5 to 7, the anti-swaying guide rail 31 is composed of an H-shaped steel 32 arranged in such a direction that recess groove portions are formed on both right and left sides and a cylindrical member (more specifically, a round pipe member) 33 attached on a lower side of the H-shaped steel 32. There are formed an upward horizontal flat rail surface 31a on an upper surface of the lower side horizontal band-like plate portion 34 horizontally protruding to the traveling guide rail 2 side of the H-shaped steel 32 and a downward circular rail surface 31b on a peripheral surface of the downside of the cylindrical member 33. Further, the anti-swaying guide rail 31 can be supported to the portal frame 10 supporting the traveling guide rail 2 via a suspension vertical member 35 and a positioning horizontal member 36, as shown in FIG. 3 and FIG. 6.

More specifically, a vertical mounting plate 37a provided at an upper end of a vertical plate member 37 fixed on the opposite side of the traveling guide rail 2 side of the H-shaped steel 32 and a vertical mounting plate 35a at a lower end of the suspension vertical member 35 hanging from the portal frame 10 side are fastened by a bolt and nut 38, and the positioning horizontal member 36 can be fixed and joined to the lower end of the vertical plate member 37. At that moment, at least one of the insertion holes of the bolt and nut 38 provided to the vertical mounting plates 35a, 37a is made vertically long in order to fine-adjust a height of the anti-swaying guide rail 31, whereupon the vertical plate member 37 can be supported adjustably in height by a support bolt 39 threadedly penetrated vertically upward to the suspension vertical member 35 side. The support bolt 39 includes a locking nut 39a for fixation after the height adjustment. According to this configuration, rotational operation of the support bolt 39 allows the anti-swaying guide rail 31 supported by the support bolt 39 to be vertically adjusted in height. In this case, an adjustment amount of the height is very small, and accordingly the height adjustment is made along with a slight vertical deformation of the positioning horizontal member 36 integrated with the anti-swaying guide rail 31. As a matter of course, the positioning horizontal member 36 can also be vertically swingably pivotally supported and joined to the portal frame 10 by a horizontal support shaft.

Further, as shown in FIG. 5 and FIG. 6, a roller introductory guide 40 is arranged at an entrance side of the anti-swaying guide rail 31. The roller introductory guide 40 is constituted by an upper side flat guide surface 42 curvedly extending obliquely upward from an end of the upper side horizontal band-like plate portion 41 of the H-shaped steel 32, a lower flat guide surface 43 linearly shortly extending obliquely downwardly from an end of the horizontal flat rail surface 31a of the anti-swaying guide rail 31, an upper side circular guide surface 44 linearly shortly extending obliquely upward from an end of the circular rail surface 31b, and a lower side circular guide surface 45 curvedly extending obliquely downwardly from a lower position of the end of the cylindrical member 33.

More specifically, the upper side flat guide surface 42 is formed from a lower surface of a horizontal plate portion 46a of an angle member 46 with one end fixed at the end of the upper side horizontal band-like plate portion 41 of the H-shaped steel 32. The lower side flat guide surface 43 is formed from an upper surface of a band-like plate 47 with a predetermined length. The upper side circular guide surface 44 is formed from a protruding curved circular surface that inclines obliquely upward on the downside of a cross-sectionally circular member 48 configured by cutting an upper portion of a round pipe member with the same predetermined length as the cylindrical member 33 obliquely to a shaft center. An opening portion obliquely cut of the upside of the cross-sectionally circular member 48 is fixed integrally with the band-like plate 47 so as to be covered, a mounting member 49 composed of the band-like plate 47 and cross-sectionally circular portion 48 and tapered when viewed from a side is fixed to an end of the anti-swaying guide rail 31 such that the lower side flat guide surface 43 thereof is connected with the horizontal flat rail surface 31a of the anti-swaying guide rail 31 while the upper side circular guide surface 44 thereof is connected with the circular rail surface 31b of the anti-swaying guide rail 31. Furthermore, a circular cylindrical member 50 made by bending a round pipe member with the same predetermined length as the cylindrical member 33 into a circular shape is arranged parallel to the cylindrical member 33 at a position directly below the end of the cylindrical member 33 and is suspended from the H-shaped steel 32 by vertical support members 51a, 51b. The lower side circular guide surface 45 is formed at an upper side peripheral surface of a front half portion of the circular cylindrical member 50 extending from the end of the cylindrical member 33.

The anti-swaying roller units 30A, 30B mounted on the hanger 6 are composed of an upper side flat peripheral surface roller 53 and a lower side hourglass-shaped peripheral surface roller 54 which are pivotally supported to an outer surface of a vertical plate 52 installed upright on the upper frame 7 of the hanger 6, as shown in FIG. 6 and FIG. 7. The upper side flat peripheral surface roller 53 rolls on the horizontal flat rail surface 31a of the anti-swaying guide rail 31 whereas the lower side hourglass-shaped peripheral surface roller 54 rolls while fitted to the circular rail surface 31b of the anti-swaying guide rail 31 from beneath. A distance between shaft centers of both rollers 53, 54 are designed such that both rollers 53, 54 can simultaneously abut against the horizontal flat rail surface 31a and circular rail surface 31b of the anti-swaying guide rail 31 and then roll. Thus, both rollers 53, 54 cannot vertically relatively move with respect to the anti-swaying guide rail 31 and their lateral relative movement with respect to the anti-swaying guide rail 31 is also prevented by the fitting of the lower side hourglass-shaped peripheral surface roller 54 to the circular rail surface 31b.

According to the above configuration, when the conveying traveling body 1 enters into the specific section where the anti-swaying guide rail 31 is installed, even if the hanger 6 is swaying slightly sideways, that is, the upper side flat peripheral surface roller 53 and lower side hourglass-shaped peripheral surface roller 54 are swaying slightly vertically, the upper side flat peripheral surface roller 53 enters into a roller introductory space flaredly opened between the upper side flat guide surface 42 and lower side flat guide surface 43 of the roller introductory guide 40, thereupon smoothly entering between the lower side horizontal band-like plate portion 34 and upper side horizontal band-like plate portion 41 of the H-shaped steel 32 constituting the anti-swaying guide rail 31 without impacting the end of the H-shaped steel 32 whereas the lower side hourglass -shaped peripheral surface roller 54 enters into a roller introductory space flaredly opened between the upper side circular guide surface 44 and lower side circular guide surface 45 of the roller introductory guide 40, thereupon smoothly entering into a lower side of the cylindrical member 33 constituting the anti-swaying guide rail 31 without impacting the end of the cylindrical member 33. Accordingly the upper side flat peripheral surface roller 53 rolls on the horizontal flat rail surface 31a of the anti-swaying guide rail 31 while the lower side hourglass-shaped peripheral surface roller 54 is fitted to the circular rail surface 31b and rolls.

Thus, when the conveying traveling body 1 travels within the specific section where the anti-swaying guide rail 31 is installed, lateral swaying movements of the hanger 6 can be prevented without fail since the upper and lower rollers 53, 54 of the anti-swaying roller unit 30A sandwich the anti-swaying guide rail 31 from above and beneath. Further, horizontal lateral movements of the hanger 6 along with lateral swaying of the conveying traveling body 1 can be prevented without fail by the circular rail surface 31b of the anti-swaying guide rail 31 and the lower side hourglass-shaped peripheral surface roller 54 fitted to the circular rail surface 31b and then rolling.

On the other hand, the above configured roller introductory guide 40 can be arranged on both ends of the anti-swaying guide rail 31 as necessary, for example, especially when the traveling direction of the conveying traveling body 1 is not stable. Further, in the aforementioned embodiment, the anti-swaying roller units 30A, 30B are arranged on both right and left sides of the hanger 6 respectively, so that the anti-swaying guide rail 31 can be installed on one side out of both right and left sides of the traveling guide rail 2 which is easier to be installed. However, the anti-swaying roller unit may be arranged at only either one of the right and left sides of the hanger 6. Additionally, it is as a matter of course that the conveying traveling body 1 and hanger 6 are not restricted to the configurations as shown in the above embodiment.

What is claimed is:

1. A suspension conveyance apparatus composed of a conveying traveling body movably supported on a traveling guide rail and an object support tool suspended from the conveying traveling body, and installed with an anti-swaying guide rail in parallel with the traveling guide rail, the anti-swaying guide rail engaged with a roller provided to the object support tool and preventing lateral swaying of the object support tool, wherein the anti-swaying guide rail is installed on only one of the right and left sides of the traveling guide rail and comprises a horizontal flat rail surface and a circular rail surface curvedly protruding in the vertically opposite direction of the horizontal flat rail surface, and a flat peripheral surface roller adjoining to the horizontal flat rail surface and rolling and an hourglass-shaped peripheral surface roller fitted to the circular rail surface are provided as the roller.

2. The suspension conveyance apparatus according to claim 1, wherein the horizontal flat rail surface of the anti-swaying guide rail is formed from one side surface of a horizontal band-like plate portion, and the circular rail surface is formed from a cylindrical member attached to another surface of the horizontal band-like plate portion.

3. The suspension conveyance apparatus according to claim 2, wherein the anti-swaying guide rail is composed of an H-shaped steel installed in such a direction that recess groove portions are formed on both right and left sides and a cylindrical member attached downside of the H-shaped steel, the horizontal flat rail surface is formed from an upper surface of a lower side horizontal band-like plate portion of the H-shaped steel, and the circular rail surface is formed from a peripheral surface of the downside of the cylindrical member.

4. The suspension conveyance apparatus according to claim 3, wherein a roller introductory guide is arranged at least at an entrance-side end of the anti-swaying guide rail, and the roller introductory guide is composed of an upper side flat guide surface extending obliquely upward from an end of an upper horizontal band-like plate portion of the H-shaped steel, a lower side flat guide surface extending obliquely downwardly from the lower side horizontal band-like plate portion of the H-shaped steel, an upper side circular guide surface extending obliquely upward from an end of the cylindrical member, and a lower side circular guide surface extending obliquely downwardly from a downside position of the end of the cylindrical member.

* * * * *